Aug. 29, 1961     K. W. COCHRAN     2,998,566
APPARATUS FOR ELECTRO-MAGNETIC INSPECTION

Filed March 16, 1959     3 Sheets-Sheet 1

INVENTOR.
KENNETH W. COCHRAN
BY
*Jerry J Dunlap*
ATTORNEY

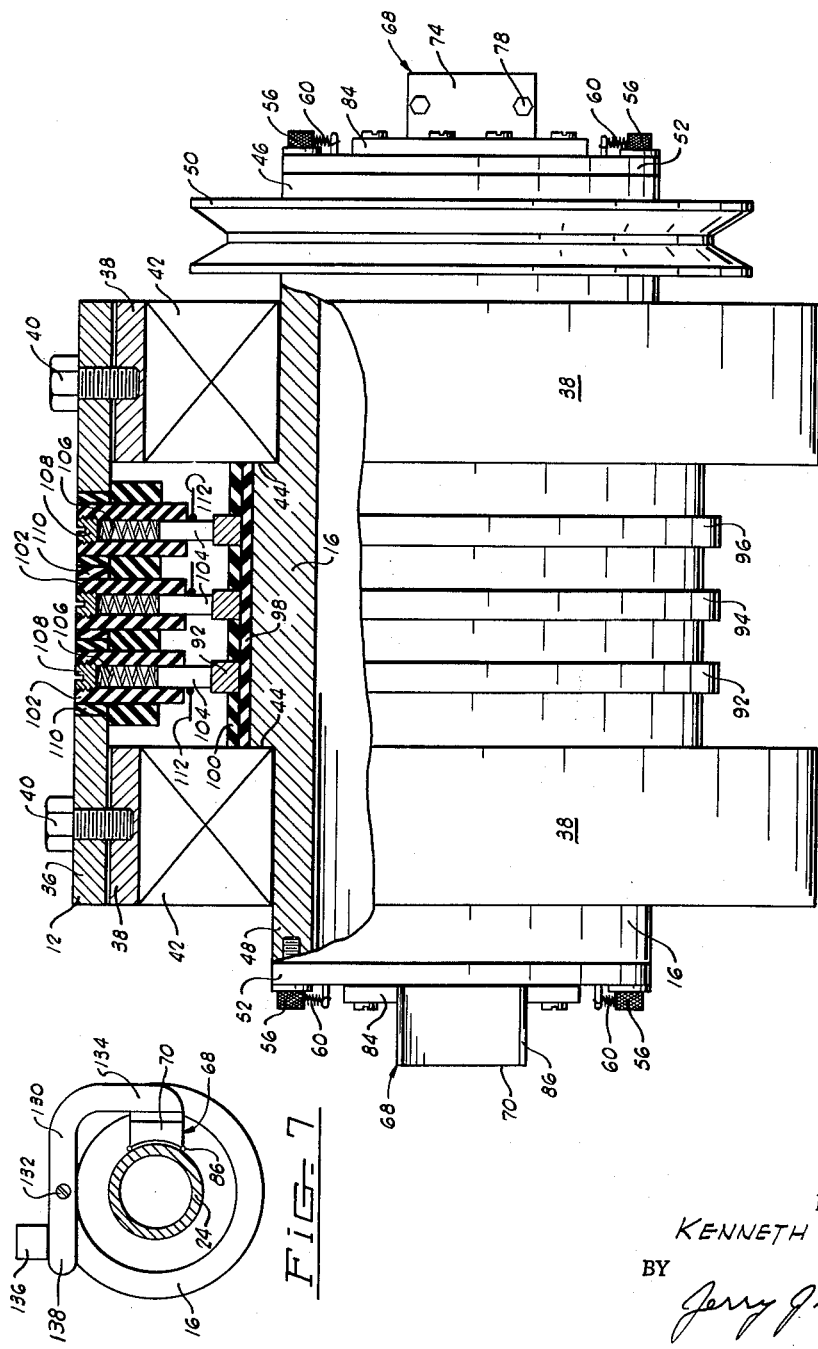

INVENTOR.
KENNETH W. COCHRAN
BY
ATTORNEY

# United States Patent Office 2,998,566
Patented Aug. 29, 1961

2,998,566
APPARATUS FOR ELECTRO-MAGNETIC INSPECTION
Kenneth W. Cochran, Oklahoma City, Okla., assignor to Russell C. Heldenbrand, doing business as Heldenbrand Tubular Service, New Iberia, La.
Filed Mar. 16, 1959, Ser. No. 799,728
2 Claims. (Cl. 324—37)

This invention relates generally, as indicated, to improvements in apparatus used in electro-magnetic inspecting operations, and more particularly, but not by way of limitation, to an improved apparatus for electro-magnetically inspecting tubing of the type used in the oil industry.

As it is well known in the art, many different designs of apparatus are available for electro-magnetically inspecting ferromagnetic drill pipe and tubing used in the oil industry for flaws such as mill flaws, laps, seams, slog inclusions, cracks and areas of the pipe which have been stressed beyond the elastic limit of the material. In these devices a portion of the pipe being inspected is magnetized by one or more magnetizing coils surrounding the pipe. The magnetization produces magnetic lines of force in the pipe which extend lengthwise along the pipe and also forms a magnetic field around the pipe with the lines of force of the magnetic field extending parallel with the longitudinal axis of the pipe. One or more pick-up coils are moved along the pipe over the magnetized area to cut the lines of force extending along the pipe. When a flaw in the pipe is of sufficient size to provide north and south magnetic poles oriented along the length of the pipe and disturb the magnetic field extending around the pipe, the current induced in the pick-up coils is varied and this current variation may be recorded to determine both the location and some indication of the seriousness of the flaw.

These devices are presently in widespread use in the oil industry and are particularly useful in the inspection of drill pipe since cracks in drill pipe normally extend a sufficient distance transversely with respect to the center line of the drill pipe to provide a variation in the magnetic field extending along the length of the pipe. However, when cracks occur in tubing they frequently extend only along the length of the tubing parallel with the center line of the tubing and are not of sufficient width to provide any appreciable variation in a magnetic field extending along the length of the tubing. As a result, these inspecting devices are many times unable to detect cracks in tubing, even when the cracks extend substantially all the way through the side wall of the tubing. Also, most prior devices utilize pick-up coils which are merely moved along the length of the pipe at a relatively slow speed. As a result, the pick-up coils do not cut the lines of force around a pipe with sufficient speed to generate easily detected variations in the current induced in the pick-up coil.

The present invention contemplates a novel apparatus which is particularly adapted to the inspection of pipe wherein flaws in the pipe frequently occur only in a plane parallel with the longitudinal axis of the pipe, such as oil field tubing. In use of the present apparatus, the tubing being inspected is subjected to a direct current along its length which in turn sets up magnetic lines of force extending around the circumference of the tubing. These magnetic lines of force will vary in intensity when any flaw occurs in the tubing, providing the flaw extends along the length of the tubing a sufficient distance to provide adjacent north and south poles oriented circumferentially with respect to the tubing. A tubular housing is loosely telescoped over the magnetized tubing and is rotated about its longitudinal axis while either the pipe is moved through the housing or the housing is moved lengthwise along the pipe. One or more pick-up coils are supported on the tubular housing to move with the housing around the tubing. The pick-up coil is therefore moved in what may be described as a helical pattern around the outer surface of the pipe to cut the magnetic lines of force extending circumferentially around the pipe. The current induced in the pick-up coil is subsequently amplified and recorded to indicate variations in the structure of the tubing.

This invention also contemplates a novel structure for supporting a pick-up coil on a rotating tubular housing for retaining the pick-up coil in close proximity with the outer surface of a pipe extending through the housing, regardless of the diameter or roundness of the pipe. The preferred supporting structure for the pick-up coil includes a yoke slidingly secured to an end of the housing and a spring for urging the yoke in one direction transversely with respect to the housing. A pick-up coil is carried on one portion of this yoke and the pick-up coil is counterbalanced by the opposite portion of the yoke, such that the pick-up coil will be yieldingly held adjacent to the pipe to follow the contour of the pipe. The yoke has an inner diameter substantially larger than a pipe extending through the housing, such that a coupling at either end of a pipe may be easily moved through the yoke and the housing without damage to the pick-up coil structure.

An important object of this invention is to provide an efficient electro-magnetic pipe inspecting apparatus.

Another object of this invention is to detect any flaw in a ferromagnetic pipe or the like which extends lengthwise along the pipe for any appreciable distance.

A further object of this invention is to reduce the time required in electro-magnetically inspecting ferromagnetic pipe and the like.

Another object of this invention is to provide an electro-magnetic pipe inspecting apparatus which will detect variations in a magnetic field extending circumferentially around the pipe.

Another object of this invention is to provide an electro-magnetic pipe inspecting apparatus wherein the pick-up coil of the apparatus will be moved adjacent the outer surface of a pipe at a substantially greater speed than the speed of movement of the pipe through the apparatus.

A still further object of this invention is to provide an electro-magnetic pipe inspecting apparatus which is simple in construction, may be easily used on various sizes of pipe, and will have a long service life.

Other objects and advantages of the invention will be evident from the following detailed description, when read in conjunction with the accompanying drawings which illustrate my invention.

In the drawings:

FIGURE 3 is a side elevational view, partially in section, of the housing assembly of an apparatus constructed in accordance with this invention, with a portion of the assembly being shown in section to illustrate details of construction.

FIGURE 7 is an end elevational view of a modified support for a pick-up coil and pick-up coil housing.

Figure 1:
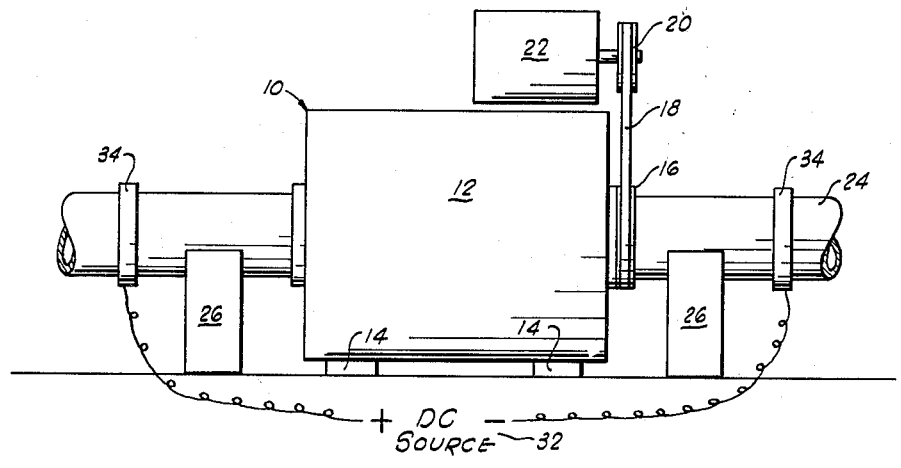
FIGURE 1 is a side elevational view of a apparatus constructed in accordance with this invention illustrating the assembly of the apparatus around a pipe and the means for magnetizing the pipe in such a manner as to provide magnetic lines of force extending circumferentially around the pipe.

Referring to the drawings in detail, and particularly FIG. 1, reference character 10 generally designates a housing structure including a stationary outer housing 12 having suitable supports 14, and a rotating inner tubular housing 16 supported in the outer stationary housing 12, as will be more fully hereinafter set forth. The inner rotating housing 16 is driven by a suitable belt 18 extending from a pulley 20 operated by a suitable motor 22. The motor 22 may be supported on top of the stationary housing 12 if desired.

Figure 2:
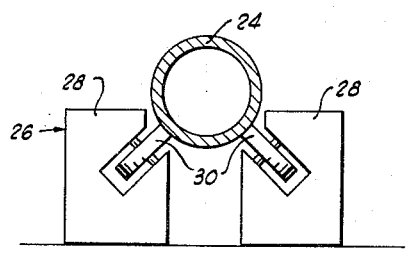
FIGURE 2 is an elevational view of a typical structure for supporting a pipe being moved through an inspecting apparatus.

The pipe 24 being inspected is extended through the inner housing 16 and may be supported concentrically in the housing 16 in any suitable manner, such as by the roller supports 26 shown in detail in FIG. 2. Each support 26 comprises a pair of stationary brackets 28 supported in spaced relation on opposite sides of the longitudinal center line of the housing construction 10. Each bracket 28 has a roller 30 journaled therein on an axis transverse to the center line of the pipe 24 being inspected. The rollers 30 are arranged on the opposite sides of the center line of the pipe 24 to efficiently support the pipe and allow free lengthwise movement of the pipe 24 through the housing construction 10.

As shown in FIG. 1, a D.C. power source 32 is connected to the pipe 24 at the opposite ends of the housing construction 10 to provide a flow of direct current lengthwise through the pipe 24. The source 32 may be connected to the pipe 24 in any suitable manner, such as by the use of ring-shaped contacts 34 which facilitate the passage of direct current through the entire cross-sectional area of the walls of the pipe 24. This direct current passing through the pipe 24 creates a magnetic field in and around the pipe, with the lines of force of the field extending circumferentially around the pipe, and the intensity of the magnetic lines of force in this magnetic field will vary with variation in the structure of the pipe 24, as previously indicated.

The outer stationary housing 12 may be of any suitable construction and is provided with a transversely extending plate 36, as shown in FIG. 3. A pair of rings 38 are secured at the opposite ends of the plate 36 by suitable bolts 40 to support bearing units 42 in the opposite ends of the stationary housing 12. The inner housing 16 is slightly longer than the outer housing 12 and is supported by the bearings 42 in a position to protrude from the opposite ends of the housing 12. The outer diameter of the inner tubular housing 16 is increased along the central portion of the housing to provide outwardly facing shoulders 44 which engage the bearings 42 and retain the inner tubular housing 16 in the desired lengthwise position in the outer housing 12. One end portion 46 of the inner housing 16 extends further outwardly from the outer housing 12 than the opposite end portion 48 to receive a sheave 50. The sheave 50 is rigidly secured on the end portion 46 of the housing 16 in any suitable manner and is used to receive the belt 18 extending from the motor 22 as illustrated in FIG. 1 to rotate the inner tubular housing 16 within the outer stationary housing 12.

Figure 5:
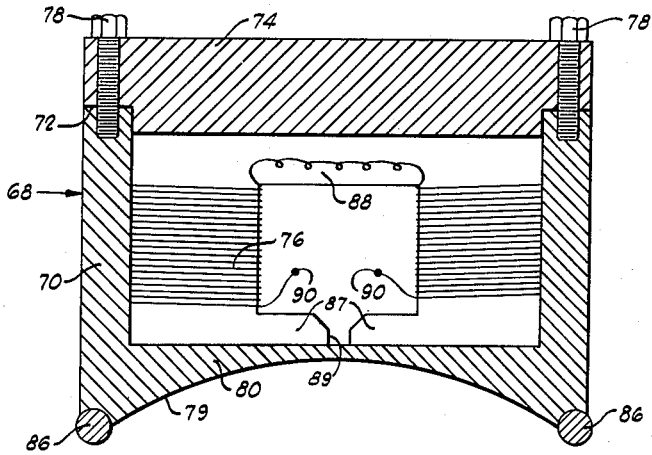
FIGURE 5 is a sectional view through a typical housing for a pick-up coil.
Figure 4:
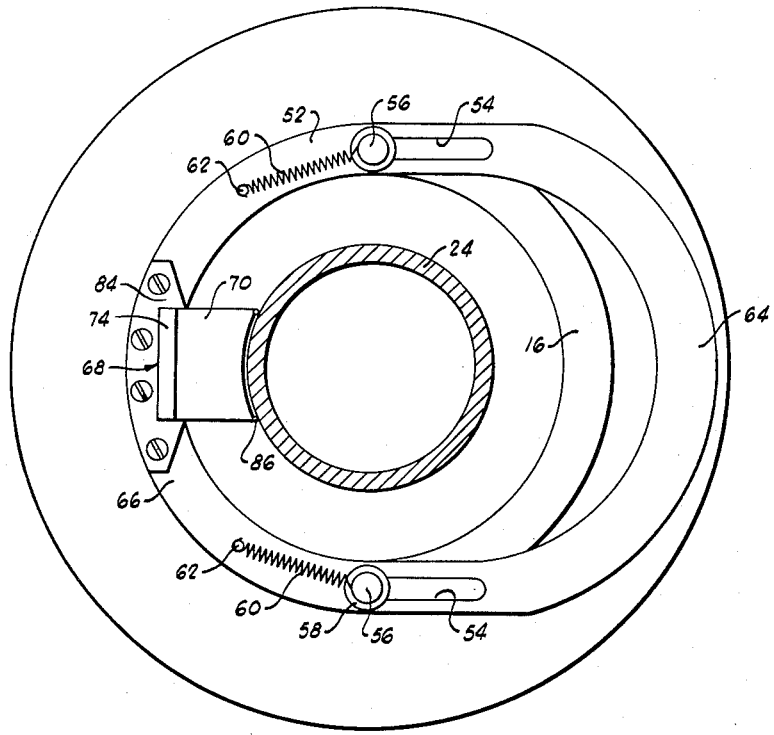
FIGURE 4 is an end elevational view of the apparatus shown in FIG. 3.

A substantially elliptically-shaped yoke 52 is mounted on each end of the tubular housing 16, as illustrated in FIGS. 3 and 4. Each yoke 52 has an inner diameter at least equal to the inner diameter of the tubular housing 16 to provide substantial clearance between the inner periphery of the yoke and the pipe 24 extending through the housing 16. Each yoke 52 is provided with slots 54 in opposite sides thereof to receive pins 56 extending from the respective end of the tubular housing 16. Each pin 56 may be provided with a washer 58, if desired, and each pair of pins 56 slidingly supports the respective yoke 52 on the respective end of the housing 16. Also, a helical tension spring 60 is secured at one end to each of the pins 56 and at its opposite end to a pin 62 on the respective yoke 52 to urge one end portion 64 of the respective yoke 52 away from the pipe 24. The opposite portion 66 of each yoke 52 is therefore urged toward the pipe 24 by the springs 60 and carries a novel pick-up coil assembly 68 which is illustrated more in detail in FIG. 5.

Each pick-up coil assembly 68 comprises a housing 70 which is rectangular in horizontal cross section and is open at its upper or outer end 72 to receive a suitable cover 74. Both the housing 70 and cover 74 are preferably formed out of a non-magnetic and substantially non-conductive material, such as a phenolic plastic, to minimize interference with operation of the pick-up coil 76 carried in the respective housing. The cover 74 may be secured on the housing 70 in any suitable manner, such as by bolts 78, to rigidly hold the respective pick-up coil 76 in the housing. The outer surface 79 of the inner end wall 80 of each housing 70 is curved on the arc of a circle preferably having a radius substantially equal to the radius of the outer surface of the pipe 24 being inspected. Each housing 70 is supported by a suitable bracket 84 on the outer face of the respective yoke 52, as illustrated in FIG. 4, to position the inner curved surface 79 of the housing 70 concentric with respect to the housing 16 and the pipe 24 being inspected. It will also be observed in FIG. 5 that a bead 86 of a hard-facing material, such as tungsten carbide, is formed along opposite edges of the wall 80 of the housing 70 to contact the outer surface of the pipe 24 being inspected. The beads 86 form long wearing surfaces to substantially extend the service life of the pick-up coil assembly.

Each pick-up coil 76 is wound around the legs 87 of a magnetic material core 88 having a gap 89 in the inner end thereof between the legs to enhance the generation of current in the respective coil 76 when the coil is moved through magnetic lines of force surrounding the pipe 24. Each core 88 is of a size (with the coil 76 wound thereon) to tightly fit in the available space in the respective housing 70 and be contacted by the cover 74 to minimize movement of the coil 76 within the housing 70 and minimize damage to the coil. It will be noted in FIG. 5 that the inner ends of the legs 87 of the core 88 are forced into contact with the inner wall 80 of the housing 70 by the cap 74 to rigidly hold the core in the housing. It will be understood, however, that any coil construction which cuts flux leakage magnetic lines of force may be used. The leads 90 of each pick-up coil 76 are connected to slip rings mounted around the housing 16 as illustrated in detail in FIG. 3.

When two pick-up coils 76 are utilized, as illustrated in the embodiment disclosed herein, three slip rings (92, 94 and 96) are secured around the central portion of the inner rotating housing 16 in any suitable manner. These slip rings 92, 94 and 96 are connected to the leads 90, as will be hereinafter shown, to collect variations in current induced in the coils 76. Each slip ring is spaced from the housing 16 by an insulating sheet 98, and the slip rings are held in spaced relation around the housing 16 by additional insulation 100 to prevent a short circuiting through the housing 16. A sleeve 102 is secured in the plate 36 in the outer housing 12 opposite each of the slip rings 92, 94 and 96 to slidingly receive a brush 104. Each brush 104 is urged inwardly by a spring 106 acting against a cap 108 threaded into the outer end of the respective sleeve 102. Each brush 104 will, of course, be formed out of an electrically conductive material, and each sleeve 102 is preferably formed out of brass. Each sleeve 102 is spaced from the plate 36 by suitable insulation 110 to prevent short circuiting through the plate 36 and housing 12. A lead 112 is secured to each brush 104 to conduct the current picked up by the respective brush 104 from the respective slip ring 92, 94 and 96.

Figure 6:
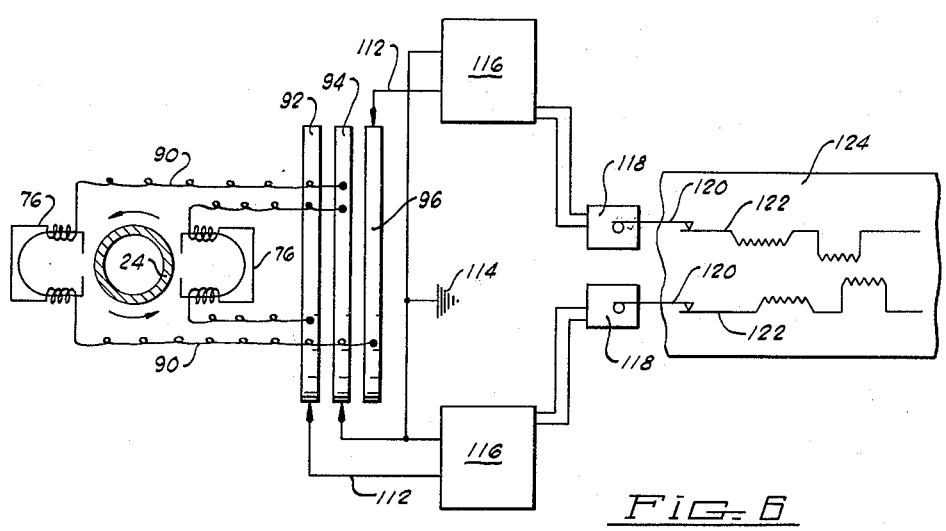
FIGURE 6 is a schematic wiring diagram of a circuit for recording variations in the current induced in the pick-up coils.

A schematic wiring diagram is illustrated in FIG. 6 where it will be observed that one of the leads 90 from each pickup coil 76 is connected to the central slip ring 94. The opposite lead 90 of each pick-up coil 76 is connected to either the slip ring 92 or the slip ring 96, with one of the coils being connected to each of the slip rings 92 and 96. The slip ring 94 may be considered the neutral slip ring since it is grounded at 114. The lead 112 extending from each of the other slip rings 92 and 96 is connected to a suitable amplifier 116. Each amplifier 116 is also connected to the common ground 114, such that each amplifier 116 will be energized by the variations in current induced in one of the pick-up coils 76. The output of each amplifier 116 is in turn connected to a separate alternating current recording head 118 of a suitable two channel recording apparatus. Each head 118 is provided with a stylus 120 to provide a curve 122 on a suitable moving recording medium 124 corresponding to the variations in the current induced in one of the pick-up coils 76.

Operation

In a normal operation of the preferred apparatus, a pipe 24 to be inspected is telescoped through the housing construction 10 a sufficient distance for connection of the D.C. source 32 to the opposite end portions of the pipe. It will be observed that the inner diameter of the inner rotating housing 16 is of sufficient size for free passage of the pipe 24 lengthwise through the housing construction. When the pipe 24 has been suitably connected to the D.C. source and is resting on the rollers 30 of the supports 28, the motor 22 is placed in operation to rotate the inner housing 16. As the housing 16 is rotated about its longitudinal axis and about the pipe 24, the pipe 24 is slowly moved lengthwise through the housing 16, such that each pick-up coil 76 follows a helical path around the pipe 24. It will be apparent that the relative lengthwise speed of the pipe 24 may be easily adjusted with respect to the speed of rotation of the housing 16 that the pick-up coils 76 will scan the entire circumference of the pipe 24 as the pipe is being moved lengthwise through the housing 16.

The weights of the opposite portions 64 and 66 of each yoke 52 are substantially balanced, such that the springs 60 will retain the inner end 80 of the respective pick-up coil housing 70 in contact with the outer surface of the pipe 24 when the inner housing 16 is rotated at the desired speed. In other words, the centrifugal forces in the opposite portions 64 and 66 of each yoke 52 are balanced at the preferred operating speed of the apparatus, such that the respective pick-up coil housing 70 will be retained in contact with the outer surface of the pipe 24 only by the action of the respective springs 60. With this arrangement, each pick-up coil housing will follow any variation of the contour of the respective pipe 24, but may be moved outwardly from the center line of the housing 16 for free passage of a coupling, tool joint or the like (not shown) on the end of the pipe 24.

As each pick-up coil 76 is moved in a helical path around the pipe 24, the pick-up coil will cut the lines of force extending circumferentially around the pipe, and any variation in the magnetic field will induce a variation in the current in the respective pick-up coil. These variations in current are fed through the slip rings 92, 94 and 96 and through the amplifiers 116 to the alternating current recording heads 118 to produce the curves 122. When the pick-up coils 76 are arranged on opposite sides of the housing 16 the resulting curves 122 will be arranged in substantially opposing relation as illustrated in FIG. 6. This dual use of pick-up coils facilitates interpretation of the curves 122, such that the various types of flaws in the pipe 24 may be easily determined. However, it is to be especially understood that only one pick-up coil 76 may be used, if desired, and will be efficient in at least the majority of uses of the present apparatus. It will also be apparent that the length of the recording medium 124 may be correlated with the length of the pipe 24, such that the various flaws detected in the pipe may be located along the length of the pipe.

A modified support for moving a pick-up coil housing 70 with the housing 16 and retaining the respective pick-up coil adjacent the pipe 24 being inspected is illustrated in FIG. 7. This modified support comprises a lever 130 pivotally secured by a pin 132 to the respective end of the housing 16 in a position to extend transversely with respect to the longitudinal center line of the housing 16. One end 134 of the lever 130 is extended at an angle with respect to the remainder of the lever and the pick-up coil housing 70 is secured thereto in any suitable manner to extend in the direction shown in FIG. 7. A counter weight 136 is secured to the opposite end 138 of the lever 130, and the counter weight 136 is of a size and so arranged to be urged outwardly by a larger centrifugal force than the centrifugal force acting on the pick-up coil assembly 68 during rotation of the housing 16.

During rotation of the housing 16 with the lever 130 secured thereto, the counter weight 136 tends to move outwardly with respect to the housing 16 to pivot the lever 130 around the pin 132 and move the pick-up coil housing 70 toward a pipe 24 being inspected. Thus, the beads 86 of hard facing material on the inner end of the housing 70 will be yieldingly held against the outer surface of the pipe 24, and the pick-up coil assembly 68 will be turned around the pipe 24 in somewhat the same manner as when utilizing the yoke construction shown in FIGS. 3 and 4. Also, the lever 130 may be manually pivoted in a direction to move the housing 70 away from the center line of the housing 16 when an enlarged end of the pipe 24 is moved through the housing 16.

From the foregoing it will be apparent that the present invention provides a novel electro-magnetic pipe inspecting apparatus which will be particularly useful in detecting flaws extending only along the length of a ferromagnetic pipe. The pick-up coils are moved at a speed substantially greater than the lengthwise movement of the pipe through the apparatus to cut the maximum number of magnetic lines of force and provide an interpretable log. It will also be apparent that the present apparatus is simple in construction, will have a long service life, and may be economically manufactured.

Changes may be made in the combination and arrangement of parts or elements as heretofore set forth in the specification and shown in the drawings it being understood that changes may be made in the embodiments disclosed without departing from the spirit and scope of the invention as defined in the following claims.

I claim:

1. A machine for detecting flaws in an elongated and magnetized ferro-magnetic article, a tubular housing having an inner diameter of a size for free passage of the article lengthwise therethrough, means for rotating the housing about its longitudinal axis and around the article, a yoke slidingly secured to one end of the housing for movement transversely with respect to the longitudinal axis of the housing, a pick-up coil, means for rigidly supporting said pick-up coil on the yoke, a spring urging the yoke in a direction to move the pick-up coil toward the center line of the housing for cutting magnetic lines of force adjacent the article upon rotation of the housing, and means for registering the current induced in the pick-up coil, said yoke being substantially elliptically shaped and dynamically balanced during rotation of the housing when the pick-up coil is positioned in close proximity with an article extending through the housing.

2. A machine for detecting flaws in an elongated and magnetized ferro-magnetic article, a tubular housing having an inner diameter of a size for free passage of the article lengthwise therethrough, means for rotating the housing about its longitudinal axis and around the article, a yoke slidingly secured to one end of the housing for movement transversely with respect to the longitudinal axis of the housing, a pick-up coil, means for rigidly supporting said pick-up coil on the yoke, a spring urging the yoke in a direction to move the pick-up coil toward the center line of the housing for cutting magnetic lines of force adjacent the article upon rotation of the housing, and means for registering the current induced in the pick-up coil, said means for supporting the pick-up coil on the yoke including a nonmagnetic material coil housing supported on the yoke with one side thereof facing an article extending through the tubular housing, said one side of the coil housing being curved on the arc of a circle substantially corresponding with the inner periphery of the tubular housing and having beads of hard-facing material along the opposed edges thereof to rub against an article extended through the tubular housing.

References Cited in the file of this patent

UNITED STATES PATENTS

| | | |
|---|---|---|
| 2,684,464 | Hastings et al. | July 20, 1954 |
| 2,685,672 | Price et al. | Aug. 3, 1954 |
| 2,878,447 | Price et al. | Mar. 1, 1959 |